Feb. 5, 1935. W. S. FINKEN 1,990,067
FLUID CLUTCH AND TRANSMISSION
Filed March 20, 1931 2 Sheets-Sheet 1
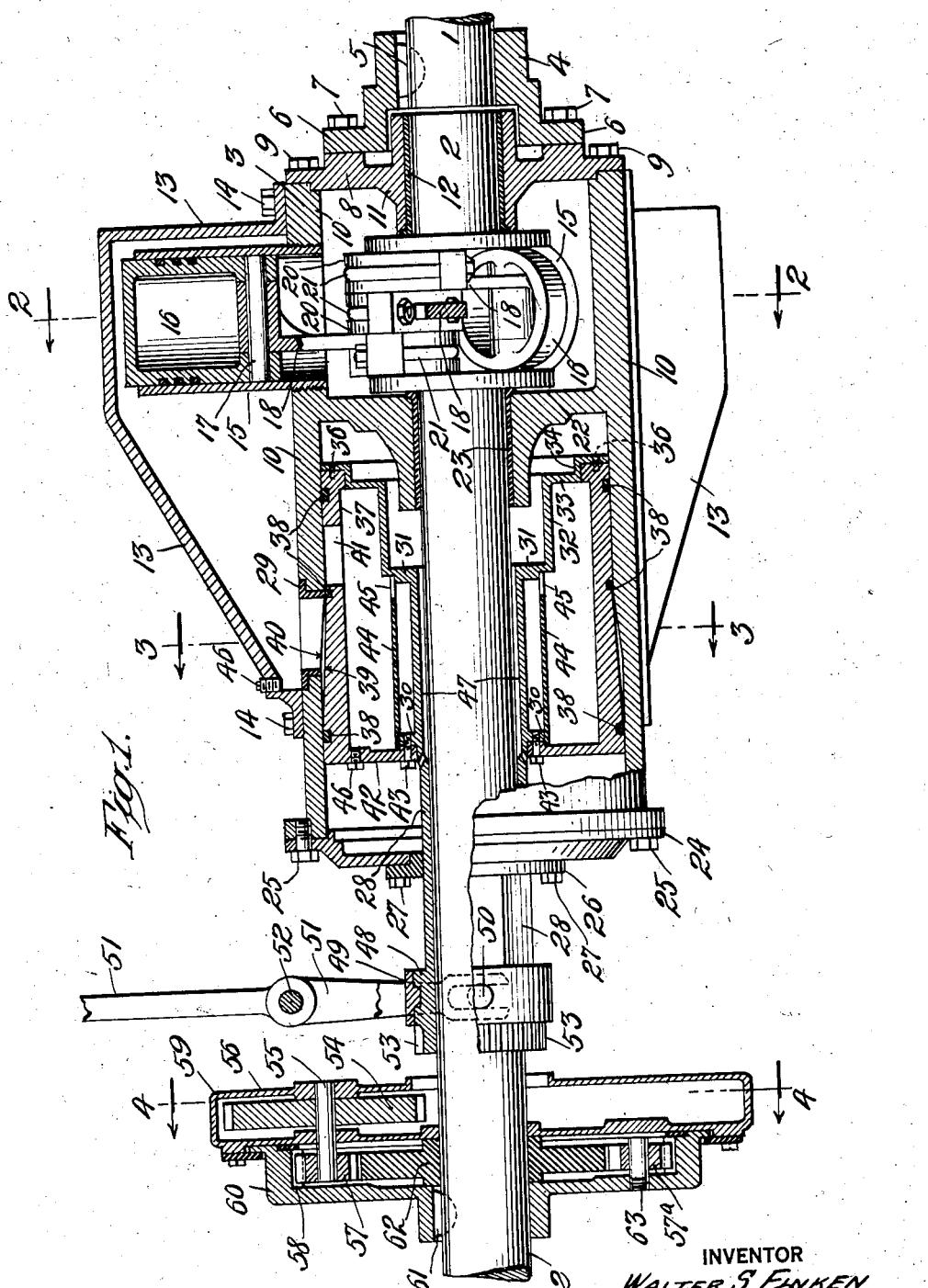
INVENTOR
WALTER S. FINKEN
ATTORNEY Feb. 5, 1935.  W. S. FINKEN  1,990,067
FLUID CLUTCH AND TRANSMISSION
Filed March 20, 1931   2 Sheets-Sheet 2
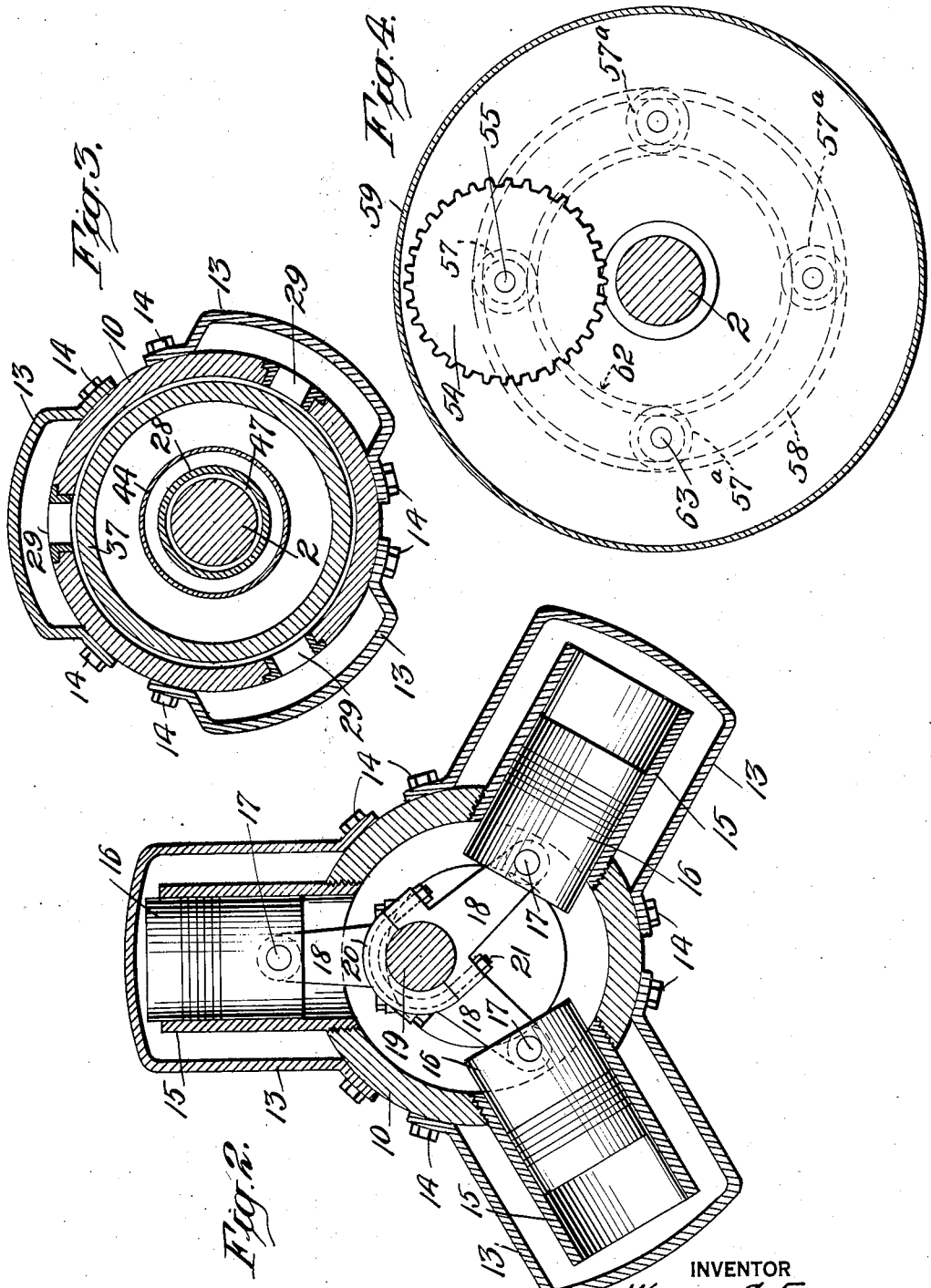
INVENTOR
WALTER S. FINKEN
BY
ATTORNEY Patented Feb. 5, 1935

1,990,067

UNITED STATES PATENT OFFICE 1,990,067

FLUID CLUTCH AND TRANSMISSION

Walter S. Finken, Brooklyn, N. Y.

Application March 20, 1931, Serial No. 524,114

2 Claims. (Cl. 192—60)

The object of my invention is to provide a device of this class which will have a driving shaft and a driven shaft and connect the two so that the speed of the driven shaft may approach the same angular velocity in the same direction as the driving shaft or any lesser angular velocity to zero or may remain at rest while the driving shaft is driven at full speed, and also to provide mechanism for a speed in reverse. This object is accomplished by means of fluid pumps with several cylinders so connected so that at least one cylinder will receive a fluid from another cylinder through more or less restricted passages, whereby the driven shaft will rotate with more or less angular velocity according to the restrictions in the passages between cylinders.

For a more detailed description of my invention, reference is to be had to the accompanying drawings forming a part hereof, in which Figure 1 is a longitudinal section of a clutch embodying my invention;

Figures 2, 3 and 4 are cross sections taken on the lines 2—2, 3—3, and 4—4 respectively of Figure 1, looking in the direction of the arrows.

Throughout the various views of the drawings, similar reference characters designate similar parts.

In the embodiment of my invention herein shown, 1 is the driving shaft, which has any desirable angular movement and is presumed to turn in one direction only, although it may turn in either direction. 2 is the driven shaft, and 3 designates generically a casing which is connected to the driving shaft so as to have its angular velocity at all times. Any suitable means, not shown, may be assumed to exist for driving the shaft 1, for the purposes of this explanation. The bearings in which this shaft turns are also omitted.

The shaft 1 carries a sleeve 4 with a key 5 which fits a corresponding key-way, not shown, in the shaft 1, and causes the sleeve 4 to have the same angular velocity as the shaft 1. This sleeve has a flange 6 which is secured by means of bolts 7 to a disc 8 which has bolts 9 that secure it to a cylinder 10 which will be more fully described below. The disc 8 has a central cylindrical boss 11 with a lining 12 of any suitable material and in this the shaft 2 may turn. The parts, just above described, keep the adjacent ends of the shafts 1 and 2 in alignment.

The cylinder 10 has a number of fluid tight housings 13, fixed thereon by means of bolts 14. In the preferred embodiment of my invention, three of these are employed, but it is obvious that a greater number may be employed if desired. Each of these housings extends laterally far enough to clear its contained cylinder 15 which is secured in any suitable manner, as by screw threads to the cylinder 10. In each cylinder 15 is slidably mounted a piston 16 which may be provided with packing rings, if desired, in the conventional manner, and each piston has its wrist pin 17, which has a pivotal connection with a piston rod 18 in any suitable manner. The other end of each rod 18 engages a suitable crank pin 19, which forms a part of the shaft 2 and is made in the conventional manner. Each piston rod 18 is held in proper relation to the crank pin 19 by means of an end 20 which, in turn, is held in place by a U-bolt 21 with nuts thereon, the bolt and nuts being made and mounted as shown.

Adjacent to each cylinder 15, the cylinder 10 has an inwardly transverse web 22 with an internal cylindrical bore to receive the bushing 23 which surrounds a portion of the shaft 2 so as to re-enforce this shaft just as it is re-enforced by the bushing 12, both of which are near to the crank pin 19. The end of the cylinder 10, which is remote from the disc 8, is provided with another disc 24 which is held in place by means of suitable bolts 25, and at the centre this disc is provided with an annulus 26, held by bolts 27, and this annulus has an opening at its centre which is out of round and is preferably hexagonal or octagonal in outline so as to fit a corresponding sleeve 28 that slides on the shaft 2 in a manner which will be described below.

The cylinder 10 also carries a plurality of bushings 29 placed substantially as shown, and each provided with an inclined bottom and near the smaller end of each housing 13 so that oil may flow through this bushing in either direction for a purpose that will be described below.

The sleeve 28 is provided with an external collar 30 not far from the disc 24 and near its inner end it is provided with a second collar 31 which is integral with a sleeve 32 and this runs to an annulus 33 which is surrounded by a flange 34 and to this is fixed in any suitable manner a laterally extending annulus 35 and this annulus carries screws 36 which enter a plunger 37 with packing rings 38 which cause it to fit the interior of the cylinder 10.

It will be noted that the innermost part of the plunger 37 has a diameter which is reduced when compared to the end near the disc 24, and between the two diameters is a tapering portion 39, which may be opposite the taper 40 in the cylinder 10, adjacent to the bushing 29, so that a restricted passage exists between these tapering parts which can be more or less closed or opened by shifting the sleeve 28, and this sleeve is shifted by a mechanism which will be described below.

At this point it is sufficient to say that the plunger 37 is also provided with suitable openings 41 which may be brought in registration or substantially so, with the openings in the bushings 29 when the sleeve 28 is projected rearwardly. When these openings are in registration, a practically unimpeded flow may take place from one piston to another, as will be described below.

The rear of the plunger 37, i. e., the part near the disc 24, is provided with an inwardly projecting flange 42 which is made to engage the flange or collar 30 by means of suitable screws 43. The collars 31 and 30 are connected by means of a cylinder 44 with suitable perforations 45 adjacent to the collar 31, so as to form an air chamber as will appear below.

For the purpose of supplying a fluid, as oil, to the cylinders 15 and connected parts, screw plugs 46 are employed at desired locations and preferably as indicated, any number of these being used as may be desirable.

Adjacent to the collars 30 and 31 and next to the shaft 2, the sleeve 28 is preferably provided with air ports 47 so as to permit the sleeve to move freely, imprisoning air under the sleeve 32 and between it and the flange 22. Of course these ports extend through this sleeve near the bolts 43, as indicated in Figure 1.

The rear end of the sleeve 28 is provided with an enlargement 48 which is grooved so as to receive a collar 49, which carries the usual pins 50 for engagement with a shifting lever 51 fulcrumed at 52 and mounted in the usual manner. The extreme rear end of this enlargement 49 is made into a pinion 53, and this may be forced into engagement with another pinion 54 fixed to a stud shaft 55, that turns freely in a suitable housing 56, and this housing also contains another pinion 57, fixed to the shaft 55 and meshing with an annular gear 58 which forms a part of the housing 56, the construction being preferably as shown with the housing 56 made in two connected parts, a fixed part 59 which carries the gear 54, and a movable part 60 which contains the gear 58, and the part 60 is fixed to the shaft 2 by means of a key 61, or any other suitable means.

To make the apparatus run more smoothly and well balanced, the pinion 57 meshes with a spur gear 62, which runs idle on the shaft 2 and meshes with a number of pinions 57a, which turn freely on their shafts 63 which are also between the casings 60 and 59, as indicated.

In view of the foregoing, the operation of my improved clutch will be readily understood, it being assumed that the interior of the housing 13 and the plunger 37 and the passage between the surfaces 39 and 40 are filled with oil or other suitable fluid, except that the cylinder 44 has trapped air therein so that it has oil only at the end adjacent to the flange 31. This is important as the temperature of the contained oil will vary and provision must be made so that the expansion of the oil can be provided for without the bursting of the apparatus. It is to be understood that oil will expand when subjected to heat, and contract when cooled so that this expansion and contraction chamber is essential for the reason just given.

Assuming that a suitable fluid is in the apparatus, as oil, and the driving shaft 1 has the desired angular velocity, the shaft 2 may be driven at approximately the same velocity by throttling the passage between the surfaces 39 and 40 by bringing these parts close together so that it is practically impossible for oil to flow from one piston to another. When this occurs, the pistons engage the crank pin 19 of the shaft 2 and cause this shaft to revolve with the same angular velocity as the shaft 1, as above stated. When, however, the lever 51 is shifted so as to bring the sleeve 28 rearwardly, the opening between these surfaces becomes larger and then the pumps are not throttled to the same extent as formerly, but can function and do function so that the shaft 2 has a velocity less than the shaft 1. When the openings 41 register with the bushings 29, this velocity may be much less and even down to zero when the passages are wide open. Similarly, by closing these passages or reducing them, the angular velocity of the shaft 2 is made to approach that of the shaft 1.

If it is desired to reverse the apparatus, the hand-lever 51 is moved to the left of Fig. 1 to slide the pinion 53 into mesh with pinion 54, this movement causing the openings 41 to be brought into registration with the openings in the bushings 29. Pinion 53 when so meshed with pinion 54, causes the pinion 57 to rotate the master idler gear 62 as well as the internal gear 58 on casing member 60. The casing member 60 thus drives the shaft in a reverse direction to the direction of rotation of the shaft 1. The several pinions 57a secured on the short shafts 63 projecting from the casing member 60, are idlers employed to balance the drive and to relieve strain. For the gear train to operate in the manner described, it is intended that the shaft 2 be under sufficient traction or drag to hold the shaft 2 and internal gear 58 motionless until the force created through the pinion 53 causes the shaft 2 to revolve in reverse direction to the direction of rotation of the shaft 1.

While I have shown and described one embodiment of my invention, it is obvious that it is not restricted thereto, but that it is broad enough to cover all structures that come within the scope of the annexed claims.

Having thus described my invention, what I claim is:

1. In a fluid clutch, a driving shaft, a driven shaft, a casing with a series of cylinders connected to the driving shaft, a crank connected to the driven shaft, a series of pistons in said cylinders connected to this crank by piston rods, a hollow plunger and means for sliding the same in said casing, openings in the casing and an interior tapered surface adjacent to said openings and a tapered surface on said plunger of an angle different than that of the tapered surface on the casing when the plunger is in certain positions relative to the casing whereby a more or less restricted oil passage may be had from cylinder to cylinder, and an air chamber connected to the interior of the plunger for cushioning effects.

2. A hydraulic clutch comprising a drive member adapted for connection to a power medium and having a main fluid chamber, a crank shaft journalled in the drive member and adapted to be connected to a device to be driven, radially extending chambers on the drive member, said drive member having ports between the radially extending chambers, open-ended cylinders located within the radially extending chambers, pistons slidable in the cylinders and connected to the crank shaft, a sleeve valve in the main chamber operative against the inner face of the wall thereof for controlling the ports, a tapered surface on the inner face of the chamber wall adjacent the ports, a tapered surface on the sleeve valve of an angle different than that of the tapered surface on the chamber wall when the sleeve valve is in certain positions relative to the chamber, and means for varying the position of the valve relative to the ports.

WALTER S. FINKEN.